(12) United States Patent
Garcia et al.

(10) Patent No.: US 7,148,603 B1
(45) Date of Patent: Dec. 12, 2006

(54) MECHANICALLY LATCHABLE TILTABLE PLATFORM FOR FORMING MICROMIRRORS AND MICROMIRROR ARRAYS

(75) Inventors: Ernest J. Garcia, Albuquerque, NM (US); Marc A. Polosky, Tijeras, NM (US); Gerard E. Sleefe, Cedar Crest, NM (US)

(73) Assignee: Sandia Corporation, Albuquerque, NM (US)

( * ) Notice: Subject to any disclaimer, the term of this patent is extended or adjusted under 35 U.S.C. 154(b) by 561 days.

(21) Appl. No.: 10/307,216

(22) Filed: Nov. 27, 2002

(51) Int. Cl.
*H02N 1/00* (2006.01)
*G02B 26/08* (2006.01)

(52) U.S. Cl. ............... 310/309; 359/225; 359/226; 359/291; 385/18

(58) Field of Classification Search ............ 310/309; 385/16, 18; 359/223–226, 290, 291
See application file for complete search history.

(56) References Cited

U.S. PATENT DOCUMENTS

| | | | |
|---|---|---|---|
| 5,097,354 A * | 3/1992 | Goto | 359/212 |
| 5,804,084 A | 9/1998 | Nasby | 216/2 |
| 5,867,302 A | 2/1999 | Fleming | 359/291 |
| 6,025,951 A | 2/2000 | Swart | 359/245 |
| 6,198,180 B1 | 3/2001 | Garcia | 310/36 |
| 6,220,561 B1 | 4/2001 | Garcia | 248/487 |
| 6,262,827 B1 * | 7/2001 | Ueda et al. | 359/224 |
| 6,360,036 B1 * | 3/2002 | Couillard | 385/19 |
| 6,430,343 B1 * | 8/2002 | Arney et al. | 385/48 |
| 6,535,319 B1 * | 3/2003 | Buzzetta et al. | 359/225 |
| 6,545,385 B1 * | 4/2003 | Miller et al. | 310/309 |
| 6,577,431 B1 * | 6/2003 | Pan et al. | 359/280 |
| 6,664,706 B1 * | 12/2003 | Hung et al. | 310/309 |
| 6,671,078 B1 * | 12/2003 | Flanders et al. | 359/254 |
| 6,738,177 B1 * | 5/2004 | Gutierrez et al. | 359/298 |
| 2002/0025106 A1 * | 2/2002 | Raccio | 385/18 |

FOREIGN PATENT DOCUMENTS

WO    WO0155770    *  8/2001

OTHER PUBLICATIONS

Ernest J. Garcia, Marc A. Polosky and Gerard E. Sleefe, "Silicon Micromirrors and Their Prospective Application in the Next Generation Space Telescope," Paper presented at the Society of Photooptical Instrumentation Engineers (SPIE) 47th Annual Meeting, Seattle, WA, Jul. 7-11, 2002.

* cited by examiner

*Primary Examiner*—Karl Tamai
(74) *Attorney, Agent, or Firm*—John P. Hohimer

(57) ABSTRACT

A microelectromechanical (MEM) apparatus is disclosed which includes a platform that can be electrostatically tilted from being parallel to a substrate on which the platform to being tilted at an angle of 1–20 degrees with respect to the substrate. Once the platform has been tilted to a maximum angle of tilt, the platform can be locked in position using an electrostatically-operable latching mechanism which engages a tab protruding below the platform. The platform has a light-reflective upper surface which can be optionally coated to provide an enhanced reflectivity and form a micromirror. An array of such micromirrors can be formed on a common substrate for applications including optical switching (e.g. for fiber optic communications), optical information processing, image projection displays or non-volatile optical memories.

36 Claims, 9 Drawing Sheets

MECHANICALLY LATCHABLE TILTABLE PLATFORM FOR FORMING MICROMIRRORS AND MICROMIRROR ARRAYS

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to microelectromechanical (MEM) devices, and in particular to a tiltable platform apparatus formed by surface micromachining with a mechanical latch mechanism to hold a platform in a tilted position even after removal of all voltages to the apparatus. The present invention is particularly useful for forming latchable micromirrors and micromirror arrays.

BACKGROUND OF THE INVENTION

Tiltable micromirrors have applications for redirecting or switching light beams. Surface micromaching based on conventional semiconductor integrated circuit (IC) processing technology has recently emerged as a way of manufacturing individual micromirrors of sub-millimeter size and arrays of such devices without the need for piece part assembly. Many different designs of micromirrors have been disclosed (see e.g. U.S. Pat. Nos. 5,867,302; 6,025,951; 6,198,180 and 6,220,561). For certain applications, it would be desirable to have a micromirror that could be switched between a pair of stable angular positions (i.e. a bistable micromirror) and to have that mirror remain in one position or the other even when all electrostatic actuation voltages have been removed. The present invention provides a tiltable and latchable platform that can be switched from being coplanar parallel with a substrate whereon the platform is formed to being tilted at an angle with respect to the substrate and locked in that position. By providing a light-reflective surface on an upper surface of the platform of the present invention, a tiltable micromirror can be formed which can be electrostatically switched in angle and mechanically latched in a tilted position until released. The present invention can also be used to form arrays of such micromirrors with a high fill factor.

SUMMARY OF THE INVENTION

The present invention relates to a microelectromechanical apparatus that comprises a platform supported above a substrate (e.g. comprising silicon) and electrostatically moveable from a first position parallel with the substrate to a second position wherein the platform is tilted at an angle (e.g. 1–20°) with respect to the substrate. The apparatus further comprises an electrostatically-operable latch mechanism formed on the substrate for engaging with a tab protruding from the platform in response to an applied latch actuation voltage for mechanically latching the platform in the second position even after the applied latch actuation voltage is removed.

The latch mechanism, which is preferably located beneath the platform, is moveable between an unlocked state wherein the platform is free to move between the first and second positions, and a locked state wherein the platform is secured in the second position until released. Such movement can be effected by a tilt actuation voltage applied between the platform or a suspended electrode attached thereto (e.g. by a flexible member) and another electrode formed on the substrate beneath the platform. A plurality of mechanical stops can be located beneath the platform for contacting the platform in the first and second positions in order to precisely define the position of the platform in these positions. The platform generally comprises polycrystalline silicon, and can optionally include a reflective coating (i.e. a mirror coating) deposited on an upper surface thereof to provide an enhanced reflectivity and thereby form a micromirror (i.e. a mirror having a microminiature size). The term "micromirror" is used interchangeably herein with the term "platform" when the platform is used for device applications which require the reflection of light from an upper surface of the platform.

The latch mechanism comprises an electrostatic comb actuator which can be formed, for example, from a pair of stationary electrostatic combs located on the substrate on either side of a moveable electrostatic comb which is suspended above the substrate on a rotatable pivot arm for movement in a plane parallel to the plane of the substrate. Each electrostatic comb further comprises a plurality of spaced apart fingers, with the fingers of the stationary electrostatic combs being arranged between the fingers formed on both sides of the moveable electrostatic comb. The fingers of each electrostatic comb can be curved to accommodate rotation of the pivot arm to engage with or disengage from the tab protruding from the platform.

In some embodiments of the present invention, an electrical connection can be made to the moveable electrostatic comb of the latch mechanism through a hair spring that is attached at one end thereof to the pivot arm and attached at the other end thereof to the substrate. When a hair spring is used, the MEM apparatus 10 can further include another electrostatically-operable latch mechanism that includes a catch for capturing an extended finger of the moveable electrostatic comb, with the catch subsequently releasing the extended finger when the catch is electrostatically moved away from the extended finger. The additional latch mechanism helps prevent the possibility that a restoring force produced by the hair spring upon compression might, under certain circumstances, inadvertently move the pivot arm and unlock the platform.

The present invention also relates to a tiltable micromirror apparatus comprising a substrate (e.g. a silicon substrate); at least one micromirror (e.g. comprising polycrystalline silicon) supported above the substrate, with each micromirror being electrostatically tiltable from a first position parallel to the substrate to a second position at an angle (e.g. 1–20°) to the substrate by use of a voltage applied between a first electrode formed on the substrate below the micromirror and a second electrode formed underneath the micromirror and connected thereto; and an electrostatically-operable latch mechanism located proximate to each micromirror and engageable with a tab protruding from the micromirror to lock the micromirror in a tilted position with respect to the substrate as needed. Each micromirror preferably includes a reflecting coating deposited on an upper surface thereof, and can further include a plurality of stops located beneath the micromirror to make contact with the micromirror in the first and second positions to precisely define these positions.

The latch mechanism used to lock each micromirror in the tilted position can comprise a pivot arm that is electrostatically moveable about a pivot to engage one end of the pivot arm with a tab attached to an underside of the micromirror to lock the micromirror in the tilted position. The pivot arm can comprise a moveable electrostatic comb which operates in combination with a pair of stationary electrostatic combs that are attached to the substrate on either side of the moveable electrostatic comb.

The pivot arm is electrostatically moveable about the pivot to engage the tab and thereby lock the micromirror in the tilted position in response to a locking voltage applied between one of the stationary electrostatic combs and the moveable electrostatic comb. The locking voltage can then be removed and the micromirror will remain locked in the tilted position until released. The micromirror can be released for further movement thereof by applying an unlocking voltage between the other of the stationary electrostatic combs and the moveable electrostatic comb. When a hair spring is provided to make an electrical connection to the moveable electrostatic comb as described previously, a second latch mechanism can also be provided to help ensure that the micromirror will remain in the locked position.

The present invention further relates to a tiltable micromirror apparatus, comprising a substrate (e.g. comprising silicon); a plurality of micromirrors (e.g. comprising polycrystalline silicon) supported above the substrate in an array, with each micromirror being electrostatically tiltable from a first position that is parallel to the substrate to a second position that is at an angle with respect to the substrate. This electrostatic tilting of each micromirror can be performed by applying a voltage between a first electrode formed on the substrate and a second electrode formed underneath the micromirror and connected thereto. An electrostatically operable latch mechanism is located proximate to each micromirror and engageable with a tab protruding therefrom to lock the micromirror in the second position even after the voltage between the first and second electrodes is removed. In the array of micromirrors, each micromirror can have lateral dimensions of, for example, 50–200 microns or more, and each adjacent pair of micromirrors in the array can be separated by a spacing of, for example, about one micron. Each micromirror in the array, which preferably includes a reflecting coating deposited on an upper surface thereof, can be tiltable over a range of, for example, 1–20 degrees with respect to a plane formed by the substrate.

The latch mechanism, which is located proximate to each micromirror and generally underneath the micromirror which the latch mechanism acts on, can comprise a pivot arm that is electrostatically moveable about a pivot to engage at one end thereof with a tab attached to an underside of the micromirror to lock the micromirror in the tilted position until released. The pivot arm for each micromirror can further comprise a moveable electrostatic comb that operates in combination with a pair of stationary electrostatic combs attached to the substrate on either side of the moveable electrostatic comb. The pivot arm for each micromirror is electrostatically moveable about the pivot to engage the tab and lock the micromirror in the tilted position in response to a locking voltage applied between one of the stationary electrostatic combs and the moveable electrostatic comb. After one or more micromirrors have been locked (i.e. latched) in a tilted position, the locking voltage can be removed. These micromirrors which have been locked in the tilted position can be unlocked as needed by providing an unlocking voltage between the other of the stationary electrostatic combs in the latched micromirrors and the moveable electrostatic comb therein. A plurality of stops are preferably provided beneath each micromirror for contacting the micromirror in the first and second positions to help in precisely defining these positions.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
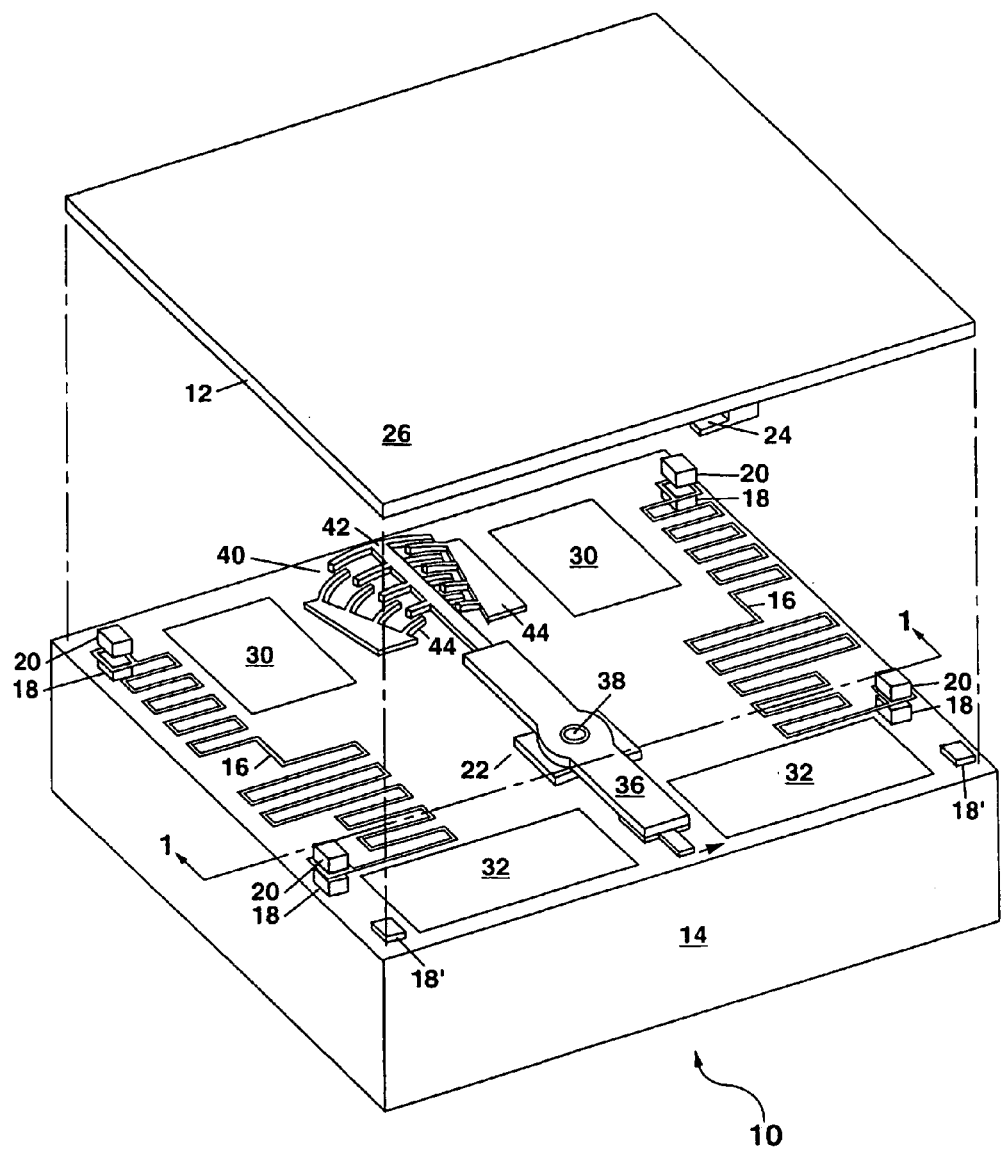
FIG. 1 schematically illustrates a perspective view of a first embodiment of the apparatus of the present invention with the platform and certain elements attached thereto being elevated above the remainder of the device to show elements of the apparatus that are formed on the substrate beneath the platform.

Referring to FIG. 1, there is shown a schematic representation of a first embodiment of the apparatus 10 of the present invention as a partially-exploded perspective view with a platform 12 which has been uplifted above the remainder of the device 10 to show the various elements of the device which are generally formed beneath the platform 12. The apparatus 10, which is formed on a substrate 14 by surface micromachining, comprises the platform 12 suspended above the substrate 14 and flexibly connected thereto by a plurality of springs 16. One end of each spring 16 is attached to the substrate 14 at the location of a mechanical stop 18 attached to the substrate 14, and the other end of each spring 16 is connected to a leg 20 that protrudes downward from the platform 12, or to the platform itself. In FIG. 1, the legs 20 are shown detached from the platform 12 for clarity.

Figure 2A:
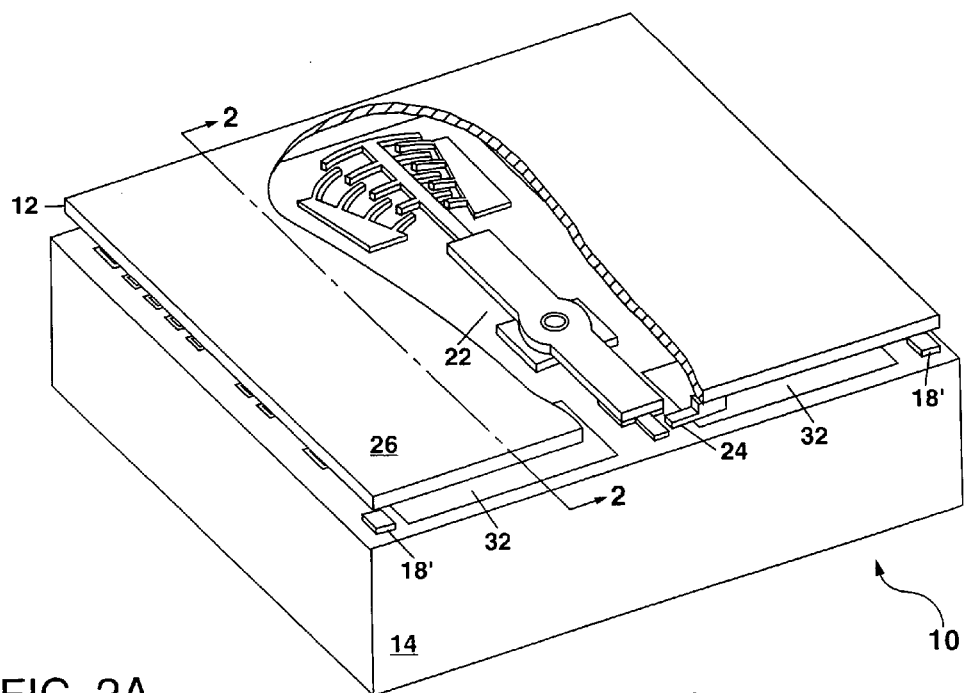
FIG. 2A shows a schematic cutaway perspective view of the first embodiment of the present invention in FIG. 1 with the electrostatically-operable latch mechanism in an unlocked position, and with the platform in an untilted position.
Figure 2B:
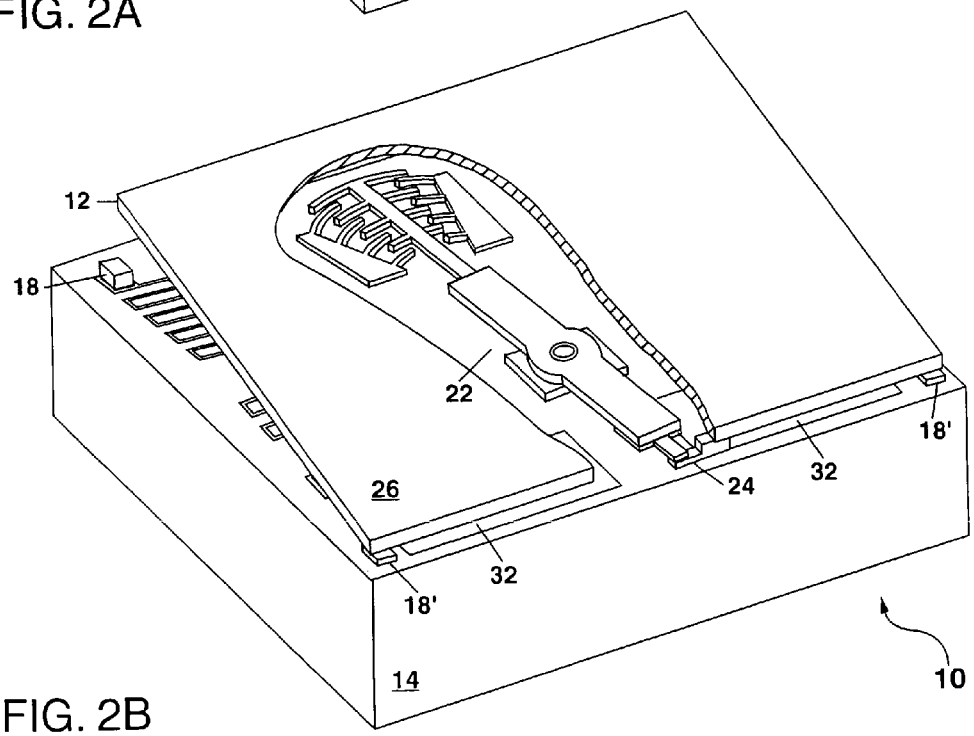
FIG. 2B shows a cutaway perspective view of the first embodiment of the present invention in FIG. 1 with the latch mechanism in a locked position, and with the platform in a tilted position.

The platform 12 is tiltable between a first position (i.e. an unlocked position) wherein the platform 12 is substantially parallel to the substrate 14 (see FIG. 2A) and a second position (i.e. a locked position) wherein the platform 12 is tilted with respect to the substrate 14 by a maximum angle of tilt of, for example, 1–20 degrees and locked into position at the maximum angle of tilt (see FIG. 2B). Locking of the platform at the maximum angle of tilt can be performed using an electrostatically-operable latch mechanism 22 as shown in FIG. 2B which can be actuated to engage with a tab 24 protruding below the platform 12. The platform 12, which can be formed with arbitrary lateral dimensions of up to several millimeters or less and generally about 50–200 µm, has a planar upper surface 26 that is preferably light reflective so that the MEM apparatus 10 in FIG. 1 can form a tiltable micromirror. With the platform 12 being constructed of polycrystalline silicon (i.e. polysilicon), the reflectivity of the upper surface 26 is about 30%. An optional reflective coating 28 (see FIG. 3L) can be deposited on the upper surface 26 to enhance the reflectivity of the upper surface to 90–99%.

In FIG. 2A, the platform 12 in the unlocked position has a plurality of legs 20 (see FIG. 4A) that rest on fixed mechanical stops 18 (i.e. pedestals) which extend outward from the substrate 14 by generally a few microns. This provides room for the various elements of the apparatus 10 which are responsible for movement and locking of the platform 12 to fit underneath the platform 12. The platform 12 is held in place by the springs 16 which are attached at one end thereof to the platform legs 20 and are anchored at the other end thereof to the substrate 14.

In the first embodiment of the present invention in FIG. 1, an electrostatic force can be generated to urge the platform 12 into contact with the mechanical stops 18 and thereby maintain the parallel position of the platform 12 against vibration or external forces. This can be done by applying a holding voltage $V_H$, which can be for example 20–30 Volts, between one or more holding electrodes 30 on the substrate 14 and corresponding holding electrodes 30' which can be suspended below the platform 12 (see FIG. 4A), with the holding electrodes 30' generally being held at ground electrical potential. In other embodiments of the present invention, the holding voltage can be applied directly between the holding electrodes 30 and the platform 12.

The platform 12 can be tilted by applying a tilt actuation voltage $V_T$, which can be, for example in the range of 30–70 Volts, between one or more tilting electrodes 32 and the platform 12, or between the tilting electrodes 32 and one or more suspended electrodes 34 underlying the platform 12 and attached thereto as will be described in detail hereinafter. As the tilt actuation voltage is increased, the angle of tilt of the platform 12 will increase until the maximum angle of tilt is attained. The maximum angle of tilt is defined when the platform 12, which tilts about a pair of the stops 18, comes into contact with a pair of back stops 18'. The heights and spacing of the stops 18 and 18' and any legs 20 supporting the platform on the stops 18 will, in general, define the maximum angle of tilt which can be, for example 1–20° and which is generally about 10°.

Once the platform 12 has been tilted to the maximum angle of tilt, the platform 12 can be locked in this position by actuating the latch mechanism 22 to rotate a pivot arm 36 to engage the tab 24 protruding from the platform 12 as shown in FIG. 2B. This locks the platform 12 in place until such time as the latch mechanism 22 is electrostatically actuated in the opposite direction to disengage the pivot arm 36 from the tab 24.

In FIG. 1, the latch mechanism 22 comprises the pivot arm 36 which is rotatable about a pivot 38 by an electrostatic comb actuator 40. The electrostatic comb actuator 40 further comprises a moveable electrostatic comb 42 formed on one end of the pivot arm 36 opposite the tab 24, and a pair of stationary electrostatic combs 44 attached to the substrate 14 about the moveable electrostatic comb 42. To lock the platform 12 at the maximum angle of tilt, a locking voltage $V_L$ (e.g. 20–30 Volts) is applied between the moveable electrostatic comb 42 and the stationary electrostatic comb 44 located on a side of the pivot arm 36 opposite the tab 24. The electrostatic force generated by the locking voltage urges the pivot arm 36 to rotate in a counterclockwise direction about the pivot 38 to engage with the tab 24 as shown in FIG. 2B. Unlocking of the latch mechanism 22 can be performed by first reapplying the tilt actuation voltage, $V_T$, to relieve a load on the end of the pivot arm 36 due to the tab 24 and spring-loaded platform 12, and then applying an unlocking voltage $V_U$ (e.g. 20–30 Volts) between the moveable electrostatic comb 42 and the stationary electrostatic comb 44 located on the other side of the pivot arm 36 to rotate the pivot arm 36 away from the tab 20 (i.e. in the clockwise direction). At this point, the tilt actuation voltage, $V_T$, can be reduced to zero to lower the platform 12 back to a position parallel with the substrate 14.

The moveable electrostatic comb 42 and the pivot arm 36 are preferably maintained at ground electrical potential. In the first embodiment of the present invention in FIG. 1, this can be done by an electrical connection to the substrate 14 or to ground electrical wiring on the substrate 14, with the electrical connection being formed, at least in part, through the pivot 38. In other embodiments of the present invention, the electrical connection through the pivot 38 can be replaced by or reinforced by an electrical connection through a hair spring 46 (see FIG. 5) for enhanced reliability. The term "hair spring" as used herein refers to a spring of arbitrary shape which has a very small force constant, k, when extended or compressed.

Those skilled in the art will understand that the various voltages (i.e. the holding voltage, the tilt actuation voltage, and the locking and unlocking voltages) used for operation of the apparatus can be provided by one or more power sources (e.g. batteries, power supplies, voltage sources, etc.) which can be computer controlled.

The MEM apparatus 10 of the present invention can be formed on a silicon substrate 14 using surface micromachining which is based on a series of well-known semiconductor processing steps. These semiconductor processing steps are used to build up the structure of the apparatus 10 layer by layer as will be described hereinafter. Build-up of the apparatus 10 involves depositing and patterning a plurality of layers of polysilicon and a sacrificial material (e.g. silicon dioxide or a silicate glass). After the build-up is completed, the sacrificial material can be removed by a selective etchant comprising hydrofluoric acid (HF) that removes exposed portions of the sacrificial material, but which does not substantially chemically attack the polysilicon or any other deposited layers (e.g. comprising silicon nitride, metals or metal alloys). This removal of the exposed sacrificial material releases the platform 12 and other elements of the apparatus 10 for movement. Each successively deposited layer of polysilicon and sacrificial material can be patterned, as needed, after deposition to define features of the apparatus 10 in that layer.

The term "patterning" as used herein refers to a sequence of well-known semiconductor processing steps including applying a photoresist to the substrate 14, prebaking the photoresist, aligning the substrate 14 with a photomask, exposing the photoresist through the photomask, developing the photoresist, baking the wafer, etching away the surfaces not protected by the photoresist (e.g. by wet etching or reactive ion etching), and stripping the protected areas of the photoresist so that further processing can take place. The term "patterning" can further include the formation of a hard mask (e.g. comprising about 500 nanometers of a silicate glass deposited from the decomposition of tetraethylortho silicate, also termed TEOS, by low-pressure chemical vapor deposition at about 750° C. and densified by a high temperature processing) overlying a polysilicon or sacrificial-material layer in preparation for defining features into the layer by etching.

Fabrication of the MEM apparatus 10 of FIG. 1 will be described hereinafter with reference to FIGS. 3A–3L which represent cross-section views along the section line 1—1 in FIG. 1.

Figure 3A:
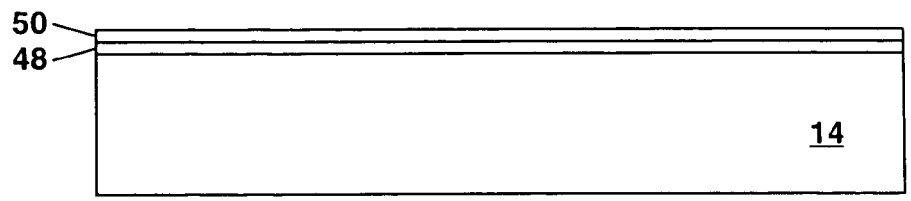
FIGS. 3A–3L show schematic cross-section views of the apparatus of FIG. 1 along the section line 1—1 to illustrate fabrication of the apparatus using surface micromachining.

In FIG. 3A, a substrate 14 comprising silicon is provided. The substrate 14 can be initially prepared for fabrication of the MEM apparatus 10 by blanketing the substrate 14 with a layer of thermal oxide 48 (about 600 nanometers thick) formed by a conventional wet oxidation process at an elevated temperature (e.g. 1050° C. for about 1.5 hours). A layer of low-stress silicon nitride 50 (e.g. 800 nanometers thick) can then be deposited over the thermal oxide layer using low-pressure chemical vapor deposition (LPCVD) at about 850° C. The thermal oxide and silicon nitride layers 48 and 50 (which have been omitted from FIG. 1) provide electrical isolation from the substrate 14 for a subsequently-deposited first polysilicon layer 52 (termed herein Poly-0). One or more vias can be photolithographically defined and etched through the thermal oxide and silicon nitride layers, if needed, so that electrical connections between the Poly-0 layer 52 and the substrate 14 can be formed.

Figure 3B:
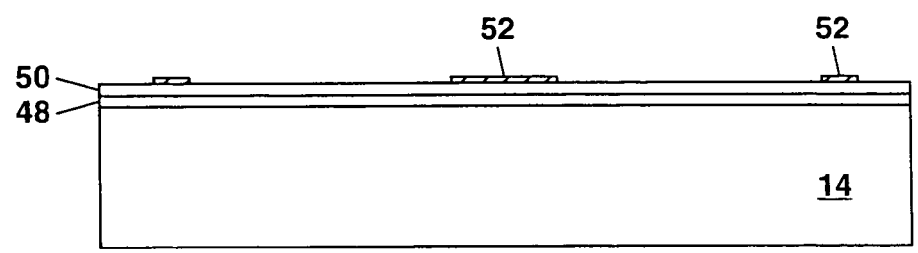

The Poly-0 layer 52, which can be about 300 nanometers thick, is deposited by LPCVD at about 580° C. to blanket the substrate 14 and the thermal oxide and silicon nitride layers 48 and 50, respectively. Phosphorous doping can be used to make the Poly-0 layer 52 and other polysilicon layers described hereinafter electrically conductive, as needed. The Poly-0 layer 52 can then be patterned as shown in FIG. 3B by photolithographic definition and etching (e.g. reactive ion etching) to form electrical wiring (not shown) to provide the operating voltages $V_H$, $V_T$, $V_L$ and $V_U$ to the various elements of the device 10. The Poly-0 layer 52 can also be used to form the electrodes 30 and 32, one or more electrical ground planes (not shown) on the substrate 14, and also to form the back stops 18' which are preferably electrically grounded. A portion of the Poly-0 layer 52 used to form the electrodes 30 and 32 can be overcoated with a thin layer of an electrically-insulating material such as silicon nitride (not shown) to prevent the possibility of electrical short circuiting of the electrodes 30 and 32 when the electrodes 30 and 32 may be contacted by electrically-grounded elements of the device 10 (e.g. the suspended electrodes 34 as shown in FIG. 4C).

In FIG. 3B, the Poly-0 layer 52 can also be used to begin to build up a base for the pivot 38 and to build up the stationary electrostatic combs 44. After deposition and patterning, the Poly-0 layer 52 can be annealed at a high temperature (e.g. at about 1100° C. for three hours) to remove any stress therein. A separate annealing step can be performed after deposition and patterning of each subsequent polysilicon layer. Is should be noted that the annealing step is preferably performed when the various polysilicon layers are encapsulated by a layer of a sacrificial material 54.

Figure 3C:
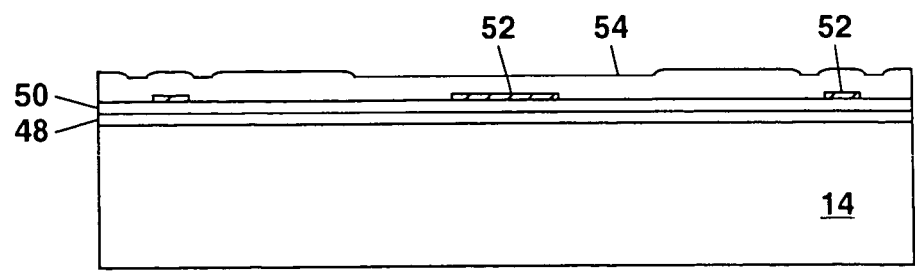

In FIG. 3C, a first layer of the sacrificial material 54 about 1-μm thick can be blanket deposited to cover the Poly-0 layer 52 and the substrate 14 by chemical vapor deposition (CVD). The sacrificial material 54 can comprise silicon dioxide ($SiO_2$) or a silicate glass (e.g. a plasma-enhanced CVD oxide, also termed PECVD oxide; or a silicate glass deposited from the decomposition of tetraethylortho silicate, also termed TEOS, by LPCVD at about 750° C. and densified by a high temperature processing).

After deposition of the sacrificial material 54 and the annealing step described above, each layer of the sacrificial material 54 can be planarized, as needed, by a chemical-mechanical polishing (CMP) step. The CMP steps utilize a slurry of abrasive particles and chemicals (e.g. potassium hydroxide) that removes the sacrificial material 54 by a combination of abrasion and oxidizing or etching the sacrificial material 54. CMP can also be used, as needed, to planarize one or more layers of the polysilicon. CMP is a well-known process for surface micromachining and has been described in U.S. Pat. No. 5,804,084 to Nasby et al, which is incorporated herein by reference. The use of CMP permits the layer thickness of each layer of the sacrificial material 54 or polysilicon to be precisely adjusted and also maintains a planar topography during build up of the structure of the MEM apparatus 10.

Figure 3D:
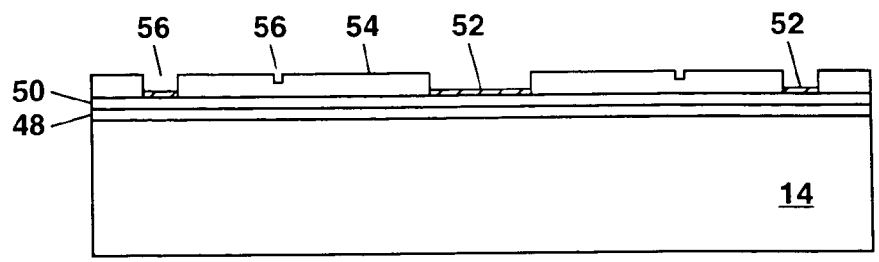

In FIG. 3D, after the CMP step, a plurality of openings 56 can be photolithographically defined and etched (e.g. by reactive ion etching) through the first layer of sacrificial material 54 to the underlying Poly-0 layer 52 at the locations of various elements of the apparatus 10 which must be built up from additional layers of deposited and patterned polysilicon (e.g. the stops 18, the base for the pivot 38 and the stationary electrostatic combs 44). The springs 16 can be formed suspended above the substrate 14 by partially etching through the first layer of the sacrificial material 54 as shown in FIG. 3D, with one end of each spring 16 being anchored to a particular stop 18 by etching completely through the first layer of the sacrificial material 54 at the location where that stop 18 is being built up.

Figure 3E:
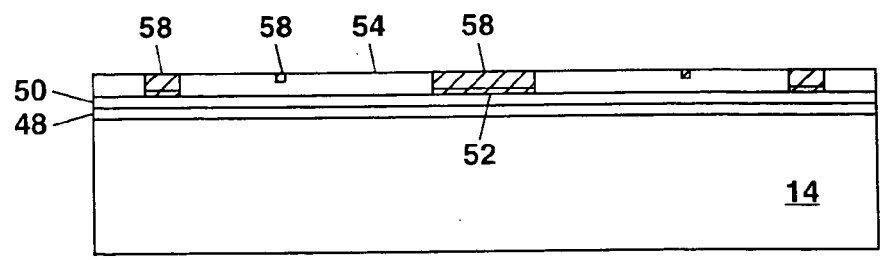

In FIG. 3E, a second layer of polysilicon 58 (termed herein Poly-1) is blanket deposited over the substrate 14 filling in the openings 56 in the sacrificial material 54. Any excess polysilicon overlying the sacrificial material 54 can be removed by masking and etching, or alternately by a CMP step. The Poly-1 layer 58 can be used to form the springs 16, and also to build up the stops 18, the base for the pivot 38 and the stationary electrostatic combs 44. Additionally, an end of the pivot arm 36 that engages the tab 24 and the tab 24 are both formed from the Poly-1 layer 58. Initially, the end of the pivot arm 36 and the tab 24 are formed parallel, but upon tilting of the platform 12, the tab 24 is lowered sufficiently to permit the end of the pivot arm 36 to override the tab 24 in the locked position.

Figure 3F:
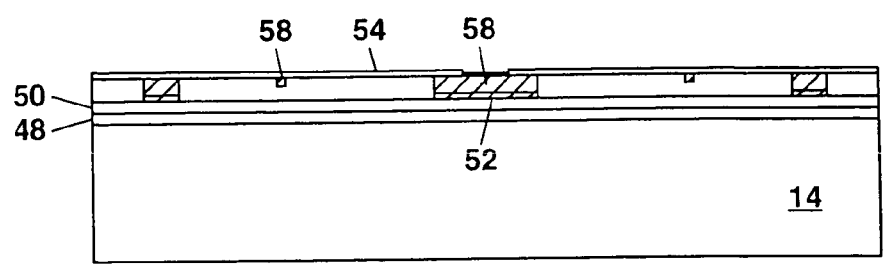

In FIG. 3F, another layer of the sacrificial material 54 about 0.5 μm thick is blanket deposited over the substrate 14 and planarized by CMP. This layer of the sacrificial material 54 is then patterned to form a plurality of shaped openings at the locations of the stationary electrostatic combs 44, the pivot 38, the pivot arm 36 (including the moveable electrostatic comb 42) and points where the electrodes 30' and 34 and the tab 24 will be attached to the platform 12.

Figure 3G:
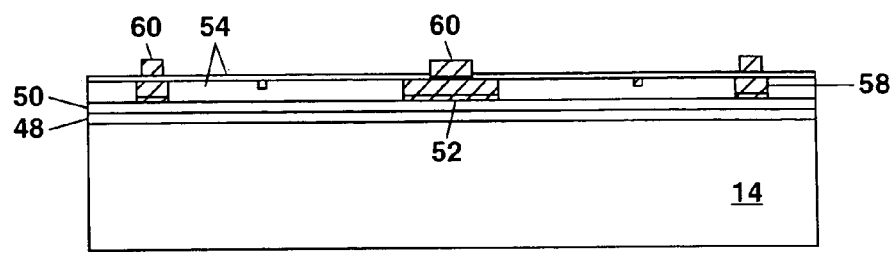

In FIG. 3G, a third polysilicon layer 60 (termed herein Poly-2) is blanket deposited over the substrate 14 and patterned. The Poly-2 layer 60, which can be 1.5 μm thick, further builds up the stationary electrostatic combs 44, the pivot 38, the pivot arm 36 and the moveable electrostatic comb 42. The Poly-2 layer 60 is also used to build up the legs 20, and attachments to the platform 12 for the electrodes 30' and 34 and for the tab 24.

Figure 3H:
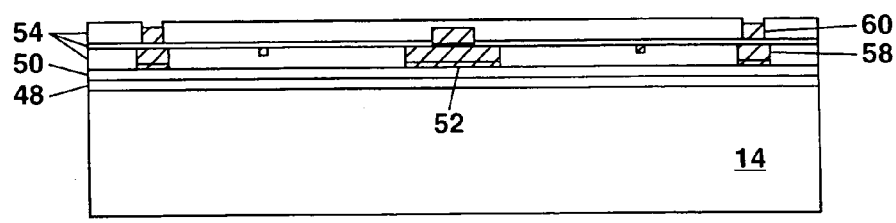

In FIG. 3H yet another layer of the sacrificial material 54 which is, for example, 2 μm thick is blanket deposited over the substrate 14 and planarized by CMP. Openings can be formed through this layer of the sacrificial material 54 at the locations of the legs 20 which are to be attached to the platform 12 to be formed from a subsequent polysilicon deposition, and at the locations where the tab 24 and electrodes 30' and 34 are to be attached to the platform 12.

Figure 3I:
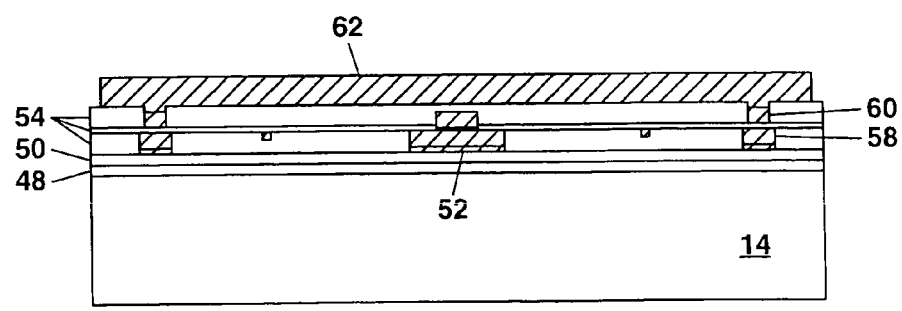

In FIG. 3I, a fourth polysilicon layer 62 (termed Poly-3) is blanket deposited over the substrate 14 and patterned to form the platform 12. The Poly-3 layer 62 can be, for example, 2.25 μm thick. In some embodiments of the present invention, an additional polysilicon layer (not shown) of a similar thickness can be deposited over the Poly-3 layer 62 and laminated thereto to provide increased rigidity for the platform 12.

Figure 3J:
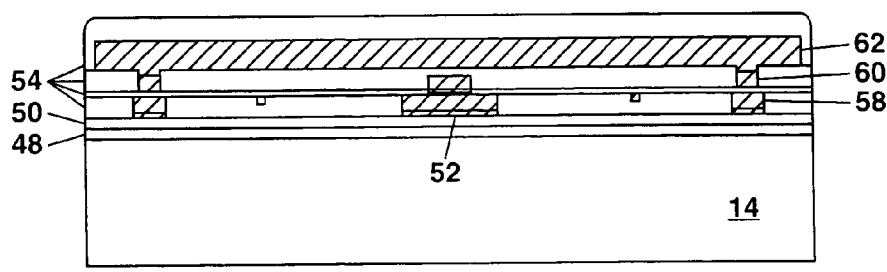

In FIG. 3J, a final layer of the sacrificial material 54 is blanket deposited over the substrate 14 to encapsulate the MEM apparatus 10 being formed prior to a final annealing step. The final annealing step serves to relieve any residual stress in the platform 12 and other elements of the apparatus 10 formed from the various polysilicon layers to limit or prevent warping of the elements of the apparatus 10 upon removal of the sacrificial material 54.

Figure 3K:
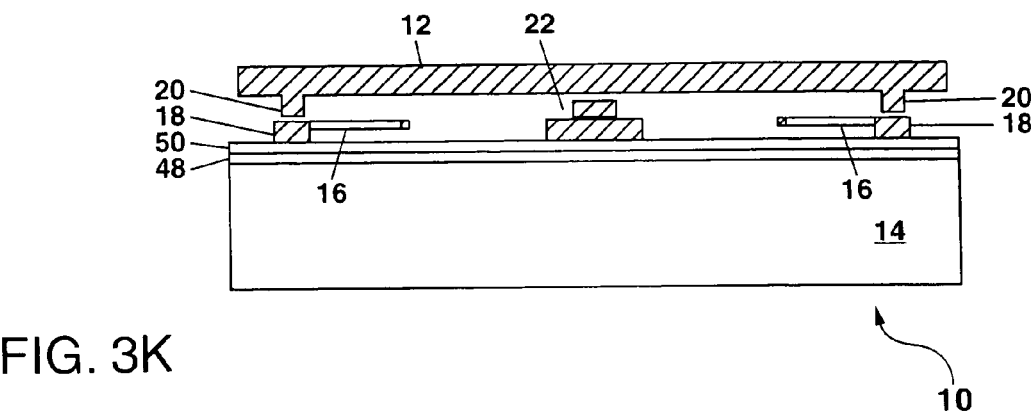

In FIG. 3K, the sacrificial material 54 is removed by an etch release step wherein the substrate 14 is contacted with a selective wet etchant comprising HF that etches away exposed portions of the sacrificial material 54 while not substantially attacking the various polysilicon layers or other materials (e.g. silicon nitride). To aid in removing the sacrificial material 54, a plurality of micron-sized etch access openings (not shown) can be formed through the various polysilicon layers (especially the Poly-3 layer 62) during patterning thereof, as needed, to expose the underlying sacrificial material 54. Removal of the sacrificial material 54 generally takes several hours and can be performed, for example, overnight. After the etch release step is completed, an anti-stiction coating as known to the art can be optionally applied over surfaces of the apparatus 10 to prevent adhesion (also termed stiction) between contacting surfaces (e.g. the electrodes 32 and 34) therein.

Figure 3L:
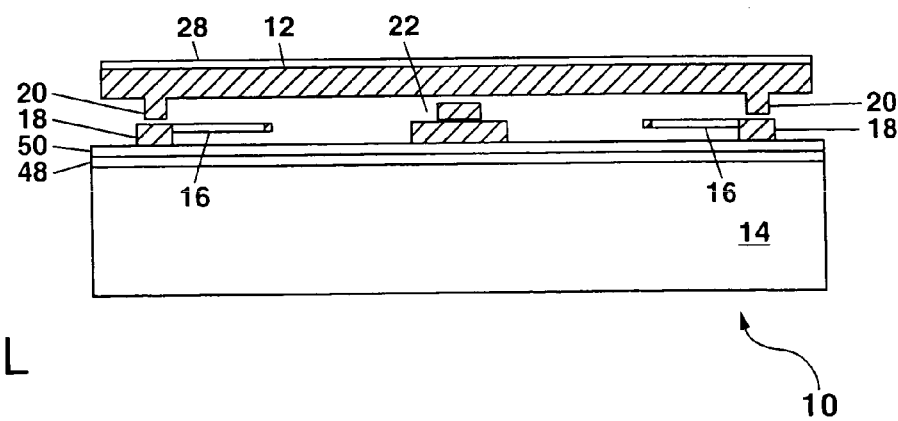

In FIG. 3L, an optional reflective coating 28 can be deposited over the upper surface 26 of the platform 12 when a tiltable micromirror apparatus 10 is to be formed. The reflective coating 28 can comprise, for example, a layer (e.g. 100 nanometers thick) of a metal (e.g. aluminum or gold) or a metal alloy deposited by evaporation or sputtering. Alternately, the reflective coating 28 can comprise a multilayer dielectric coating formed by depositing a plurality of alternating layers of two dielectric materials having different dielectric constants (e.g. $TiO_2$ and $SiO_2$) with each deposited dielectric layer generally being about one-quarter wavelength thick for a predetermined wavelength of incident light for operation of the apparatus 10.

Figure 4A:
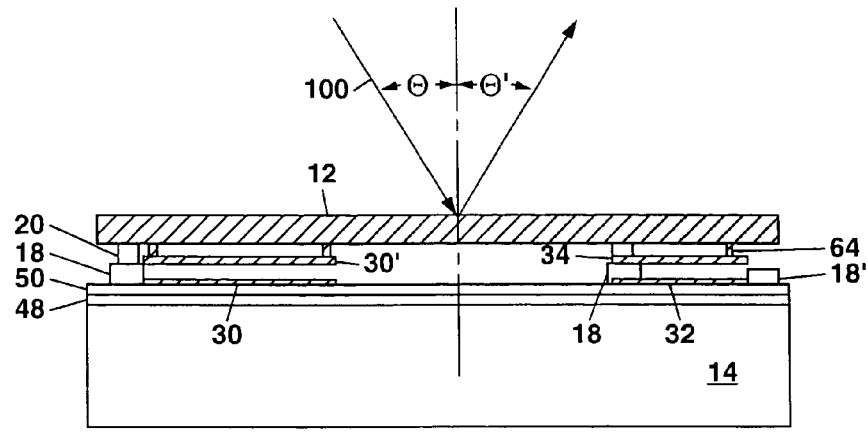
FIGS. 4A–4C show schematic cross-section views of the apparatus of FIG. 1 along the section line 2—2 in FIG. 2A to illustrate tilting of the platform by an electrostatic force of attraction produced between a tilting electrode on the substrate and a suspended electrode cantilevered below the platform and attached thereto by a flexible member.
Figure 4B:
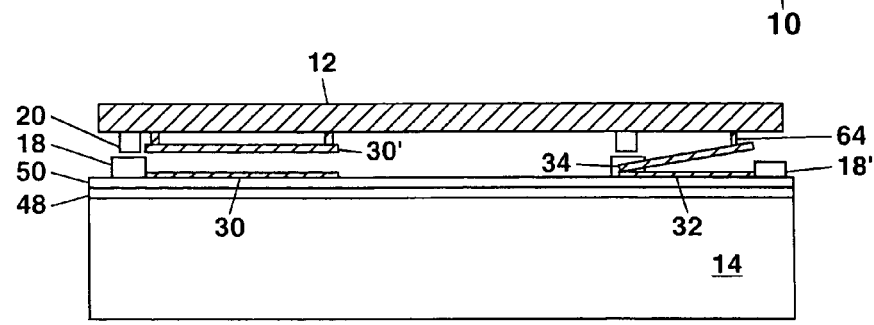
Figure 4C:
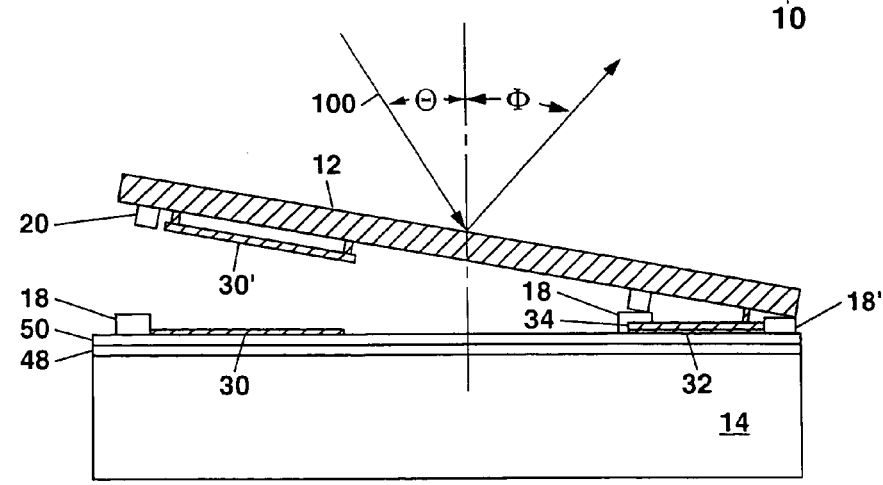

FIGS. 4A–4C show schematic cross-section views of the first embodiment of the MEM apparatus 10 of FIG. 1 along the section line 2—2 in FIG. 2A to illustrate operation of the apparatus 10. For clarity, certain elements of the apparatus 10 including the springs 16 and the electrostatically-operable latch mechanism 22 have been omitted from FIGS. 4A–4C.

FIG. 4A shows the apparatus 10 with the platform 12 being in the unlocked position and parallel to the substrate 14. In this position, the holding voltage $V_H$ can be optionally applied between the holding electrodes 30 and 30' to produce an electrostatic force of attraction that urges the legs 20 into contact with the stops 18 and thereby holds the platform 12 parallel to the substrate 14 and firmly in place to resist movement or tilting of the platform due to external forces (e.g. gravity, acceleration, vibration etc.). In the unlocked position, a light beam 100 incident on the upper surface 26 of the platform 12 at an angle of incidence Θ with respect to an axis normal to the substrate 14 will be reflected off the platform 12 at an equal and opposite angle Θ'.

In FIG. 4B, to tilt the platform 12 with respect to the plane of the substrate 14, the holding voltage, if used, can be removed and the tilt actuation voltage $V_T$ can be applied between the tilting electrodes 32 and superposed suspended electrodes 34 which are attached to the platform 12 by one or more flexible members 64, with the suspended electrodes 34 being cantilevered below the platform 12 by the flexible members 64. Each flexible member 64 can comprise, for example, a torsional hinge formed from the same layer (i.e. the Poly-1 layer 58) as the suspended electrode 34 and attached to the platform 12 through an attachment formed in the Poly-2 layer 60. Alternately, each flexible member 64 can comprise a flexure formed from one or more layers of deposited and patterned polysilicon.

In FIG. 4B, the tilt actuation voltage $V_T$ produces an electrostatic force of attraction between the electrodes 32 and 34 which causes an unpinned side of each suspended electrode 34 to move downward towards the underlying tilting electrode 32. As the unpinned side of each suspended electrode 34 moves closer to the tilting electrode 32, the electrostatic force of attraction on the unpinned side increases as the inverse square of the distance. This increased electrostatic force of attraction leads further urges the unpinned side downward until the unpinned side of each suspended electrode 34 contacts the tilting electrode 32 as shown in FIG. 4B.

It should be noted that the suspended electrode 34 is preferably maintained at ground electrical potential by an electrical connection formed through the flexible member 64, the platform 12 and the springs 16. It should also be noted that an electrical insulating layer (e.g. silicon nitride) can be provided over the tilting electrode 32 as described previously or underneath the suspended electrode 34 so that the electrodes 32 and 34 do not produce an electrical short circuit when they contact each other. In some embodiments of the present invention, a plurality of stops can be provided on the substrate 14 to prevent direct contact between the electrodes 32 and 34.

In FIG. 4C, further increasing the tilt actuation voltage $V_T$ increases the electrostatic force of attraction and urges more and more of each suspended electrode 34 into contact with the underlying tilting electrode 32 thereby pivoting the platform 12 about a pair of the stops 18 located proximate to the electrodes 32 and 34 as shown in FIG. 4C. Further tilting of the platform 12 ceases at the maximum angle of tilt when the electrodes 32 and 34 are in complete contact with each other, or when the platform 12 contacts the back stop 18', whichever comes first. At this position, the latch mechanism 22 can be actuated to engage the tab 24 and mechanically latch the platform 12 in the locked position so that the tilt actuation voltage $V_T$ can be removed. In the locked position, the incident light beam 100 will be reflected off the upper surface 26 of the platform 12 at an angle Φ which is equal to the angle of incidence, Θ, plus the maximum angle of tilt of the platform 12.

In FIG. 4C, the platform 12 will remain in the locked position until the platform 12 is unlocked by reapplying the tilt actuation voltage $V_T$ and then applying an unlocking voltage $V_U$ to the electrostatically-operable latch mechanism 22 to rotate the pivot arm 36 in the opposite direction. When this is done, the platform 12 will be urged to return to a position parallel to the substrate 14 by a restoring force produced by the springs 16 which are bent during tilting of the platform 12. In other embodiments of the present invention, the flexible member 64 and the suspended electrode 34 can be omitted and the tilting voltage $V_T$ applied between the tilting electrode 32 and the platform 12.

Figure 5:
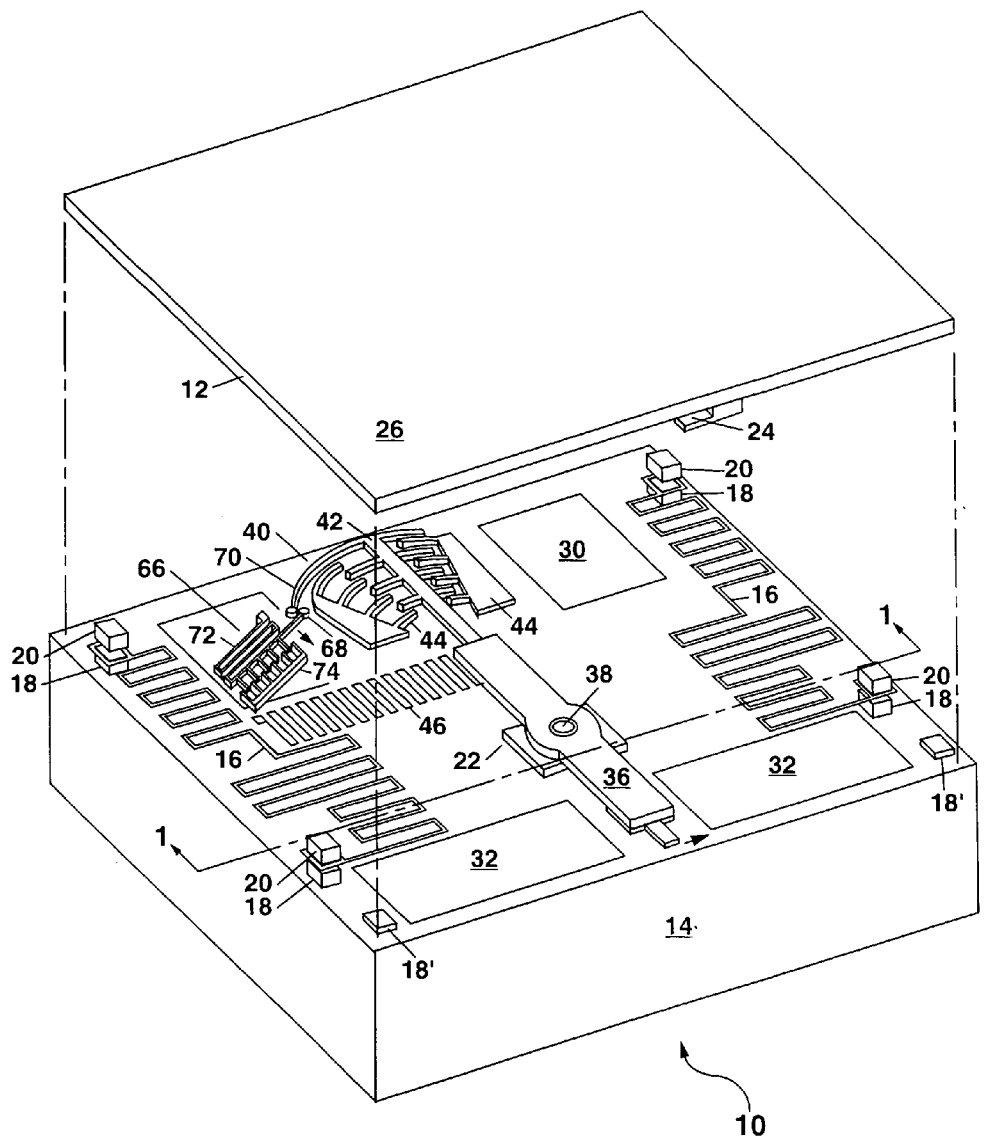
FIG. 5 shows a perspective view of a second embodiment of the apparatus of the present invention with the platform and certain elements attached thereto being elevated above the remainder of the device to show elements of the apparatus that are formed on the substrate beneath the platform.

FIG. 5 shows a schematic perspective view of a second embodiment of the MEM apparatus 10 of the present invention with the platform 12 uplifted to show details of the various elements of the apparatus 10 which are formed below the platform 12. The second embodiment of the MEM apparatus 10 can be formed by surface micromachining using a series of process steps as described previously with reference to FIGS. 3A–3L.

In FIG. 5, the second embodiment of the MEM apparatus 10 includes, in addition to the elements shown in FIG. 1 and described previously, a hair spring 46 and a second latch mechanism 66. The hair spring 46 provides a direct electrical connection between the pivot arm 36 and electrical wiring on the substrate 14 for electrically grounding the pivot arm 36 and the moveable electrostatic comb 42. The second latch mechanism 66, which can partly overlie one of the electrodes 30, is provided in this embodiment of the present invention to compensate for a force on the pivot arm 36 produced by compression of the hair spring 46 upon rotation of the pivot arm 36 to the locked position. The second latch mechanism 66 can also help to prevent any possibility for premature unlocking of the latch mechanism 22.

In FIG. 5, the hair spring 46 can be formed from the Poly-2 layer 60 and anchored at one end to the pivot arm 36, with the other end of the hair spring 46 being anchored to the substrate 14 (e.g. through the Poly-0 layer 52 and the Poly-1 layer 58) and connected to electrical ground wiring formed on the substrate 14. The second latch mechanism 66 can be formed from a plurality stacked polysilicon layers (e.g. the Poly-0 through Poly-2 layers).

The second latch mechanism 66 can be provided on the substrate 14 with a spring-loaded catch 68 that captures a shaped end of an extended finger 70 of the moveable electrostatic comb 42 when the pivot arm 36 is rotated to the locked position by application of the locking voltage $V_L$. The second latch mechanism 66 thus holds the pivot arm 36 in the locked position until a subsequent activation of the second latch mechanism 66 by the application of a release voltage $V_R$ (e.g. 10–30 Volts) between a stationary electrostatic comb 74 formed on the substrate 14 and an electrically-grounded moveable electrostatic comb 72 which is suspended over the substrate 14. The moveable electrostatic comb 72, which is formed integrally with a folded spring and the catch 68, is urged toward the stationary electrostatic comb 74 by the electrostatic force of attraction produced by the release voltage $V_R$ thereby moving the catch 68 and releasing the finger 70. With the finger 70 released, the pivot arm 36 can be rotated to disengage from the tab 24 by applying the tilt activation voltage $V_T$ and the unlocking voltage $V_U$ as described previously.

Figure 6:
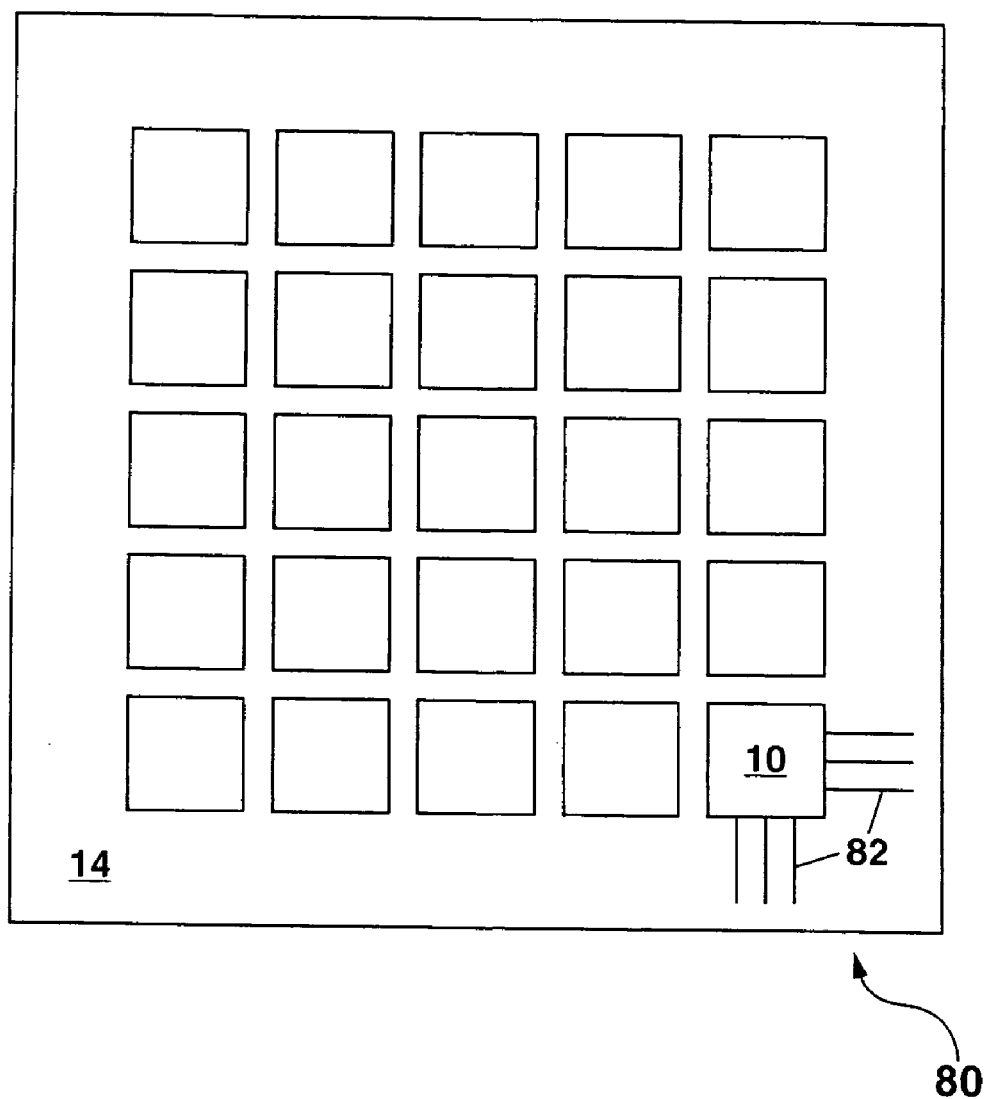
FIG. 6 shows a schematic plan view of a third embodiment of the present invention in the form of a micromirror array.

FIG. 6 shows a third embodiment of the present invention in the form of a two-dimensional micromirror array 80 which comprises a plurality of closely-spaced micromirrors 10 formed on a common substrate 14. Such a micromirror array 80 formed with 100×100 μm square micromirrors 10 each separated from an adjacent micromirror 10 by a spacing of 1 μm would result in a high fill factor of 98% for the reflection of incident light. In the micromirror array 80, the latch mechanism 22 for each micromirror 10 can be formed either underneath the reflecting platform 12 for that micromirror 10 as shown in FIG. 1, or alternately proximate to the platform 12 (e.g. underneath the platform 12 of another micromirror 10 with the end of each pivot arm 36 extending beneath the platform 12 which that pivot arm 36 acts upon to permit engagement of the tab 24 for that platform 12).

Electrical wiring 82 can be formed on the substrate 14 (e.g. by patterning the Poly-0 layer 52) to provide the various operating voltages $V_H$, $V_T$, $V_L$, $V_U$ and $V_R$ as needed to the micromirrors 10 in the array 80 either individually or in groups (e.g. by row or column addressing and operation). The electrical wiring 82 can connect the devices 10 in the micromirror array 80 to a plurality of bond pads (not shown) located around the periphery of the substrate 14 to allow for packaging of the array 80. Such a micromirror array 80 has applications for switching a plurality of incident light beams 100 and can be used to form, for example, an optical switch (e.g. for fiber optic communications), an optical information processor (e.g. an optical computer), an image projection display or a non-volatile optical memory.

Other applications and variations of the present invention will become evident to those skilled in the art. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A microelectromechanical apparatus, comprising:
   (a) a platform supported above a substrate and electrostatically moveable from a first position parallel to the substrate to a second position wherein the platform is tilted at an angle to the substrate; and
   (b) an electrostatically-operable latch mechanism formed on the substrate with a pivot arm extending substantially parallel to the substrate for engaging with a tab protruding from the platform in response to an applied latch actuation voltage, thereby mechanically latching the platform in the second position even after the applied latch actuation voltage is removed.

2. A microelectromechanical apparatus, comprising:
   (a) a platform supported above a substrate and electrostatically moveable from a first position parallel to the substrate to a second position wherein the platform is tilted at an angle to the substrate; and
   (b) an electrostatically-operable latch mechanism formed on the substrate and located beneath the platform for engaging with a tab protruding from the platform in response to an applied latch actuation voltage, thereby mechanically latching the platform in the second position even after the applied latch actuation voltage is removed.

3. The apparatus of claim 1 wherein the latch mechanism is moveable between an unlocked state wherein the platform is free to move between the first and second positions, and a locked state wherein the platform is secured in the second position.

4. The apparatus of claim 1 wherein the platform is reflective to incident light.

5. The apparatus of claim 1 wherein the platform includes a reflective coating deposited on an upper surface thereof.

6. The apparatus of claim 1 wherein the platform is electrostatically moveable between the first and second positions in response to a tilt actuation voltage applied between the platform or a suspended electrode attached thereto and another electrode formed on the substrate beneath the platform.

7. The apparatus of claim 6 further comprising a flexible member for attaching the electrode to the platform.

8. The apparatus of claim 1 further comprising a plurality of stops located beneath the platform for contacting the platform in the first and second positions to precisely define the position of the platform in the first and second positions.

9. The apparatus of claim 1 wherein the platform comprises polycrystalline silicon.

10. The apparatus of claim 9 wherein the substrate comprises silicon.

11. The apparatus of claim 1 wherein the latch mechanism comprises an electrostatic comb actuator.

12. A microelectromechanical apparatus, comprising:
  (a) a platform supported above a substrate and electrostatically moveable from a first position parallel to the substrate to a second position wherein the platform is tilted at an angle to the substrate; and
  (b) an electrostatically-operable latch mechanism formed on the substrate and further comprising an electrostatic comb actuator having a pair of stationary electrostatic combs on the substrate on either side of a moveable electrostatic comb which is suspended above the substrate on a rotatable pivot arm that extends substantially parallel to the substrate for movement in a plane parallel to the plane of the substrate to engage a tab protruding from the platform in response to a latch actuation voltage applied to the electrostatic comb actuator, thereby mechanically latching the platform in the second position after the latch actuation voltage is removed, with each electrostatic comb further comprising a plurality of spaced apart fingers, and with the fingers of the stationary electrostatic comb being arranged between the fingers of the moveable electrostatic comb.

13. The apparatus of claim 12 wherein the fingers are curved.

14. The apparatus of claim 12 wherein an electrical connection to the moveable electrostatic comb is made through a hair spring attached at one end thereof to the pivot arm and attached at the other end thereof to the substrate.

15. The apparatus of claim 14 further including another electrostatically-operable latch mechanism having a catch for capturing an extended finger of the moveable electrostatic comb, with the catch subsequently releasing the extended finger when the catch is electrostatically moved away from the extended finger.

16. The apparatus of claim 1 wherein the angle of tilt is in the range of 1–20 degrees.

17. A tiltable micromirror apparatus, comprising:
  (a) a substrate;
  (b) at least one micromirror supported above the substrate, with each micromirror being electrostatically tiltable from a first position parallel to the substrate to a second position at an angle to the substrate by a voltage applied between a first electrode formed on the substrate and a second electrode formed underneath the micromirror and connected thereto; and
  (c) an electrostatically-operable latch mechanism located proximate to each micromirror and engageable with a tab protruding from the micromirror to lock the micromirror in a tilted position with respect to the substrate, with the electrostatically-operable latch mechanism further comprising a pivot arm that is electrostatically moveable about a pivot to engage one end of the pivot arm with the tab attached to an underside of the micromirror to lock the micromirror in the tilted position.

18. The apparatus of claim 17 wherein the substrate comprises silicon.

19. The apparatus of claim 18 wherein each micromirror comprises polycrystalline silicon.

20. The apparatus of claim 17 wherein each micromirror further comprises a reflecting coating deposited on an upper surface thereof.

21. The apparatus of claim 17 further comprising a plurality of stops located beneath the micromirror for contacting the micromirror in the first and second positions to precisely define the position of the micromirror in the first and second positions.

22. The apparatus of claim 17 wherein the pivot arm comprises a moveable electrostatic comb which operates in combination with a pair of stationary electrostatic combs attached to the substrate on either side of the moveable electrostatic comb, with the pivot arm being electrostatically moveable about the pivot to engage the tab and lock the micromirror in the tilted position in response to a locking voltage applied between one of the stationary electrostatic combs and the moveable electrostatic comb, and with the pivot arm further being electrostatically moveable about the pivot to disengage from the tab and to unlock the micromirror for further movement in response to an unlocking voltage applied between the other of the stationary electrostatic combs and the moveable electrostatic comb.

23. The apparatus of claim 22 wherein an electrical connection to the moveable electrostatic comb is made through a hair spring attached at one end thereof to the pivot arm and attached at the other end thereof to the substrate.

24. The apparatus of claim 23 further including another electrostatically-operable latch mechanism comprising a stationary electrostatic comb and a moveable electrostatic comb, with the moveable electrostatic comb being supported above the substrate by a folded spring and further including a catch for capturing an extended finger of the moveable electrostatic comb, with the catch subsequently releasing the extended finger when the catch is electrostatically moved away from the extended finger.

25. The apparatus of claim 17 wherein each micromirror is tiltable over an angle of 1 to 20 degrees with respect to the substrate.

26. A tiltable micromirror apparatus, comprising:
  (a) a substrate;
  (b) a plurality of micromirrors supported above the substrate in an array, with each micromirror being electrostatically tiltable from a first position parallel to the substrate to a second position at an angle with respect to the substrate by a voltage applied between a first electrode formed on the substrate and a second electrode formed underneath the micromirror and connected thereto; and
  (c) an electrostatically operable latch mechanism located proximate to each micromirror and engageable with a tab protruding beneath the micromirror to lock the micromirror in the second position even after the voltage between the first and second electrodes is removed.

27. The apparatus of claim 26 wherein the substrate comprises silicon.

28. The apparatus of claim 26 wherein each micromirror comprises polycrystalline silicon.

29. The apparatus of claim 26 wherein a spacing between each adjacent pair of micromirrors in the array is about one micron.

30. The apparatus of claim 26 wherein each micromirror has lateral dimensions in the range of 50–200 microns.

31. The apparatus of claim 26 wherein each micromirror further comprises a reflecting coating deposited on an upper surface thereof.

32. The apparatus of claim 26 wherein each micromirror is tiltable over an angle of 1 to 20 degrees with respect to the substrate.

33. The apparatus of claim 26 wherein each electrostatically operable latch mechanism comprises a pivot arm that is electrostatically moveable about a pivot to engage at one end thereof with the tab to lock the micromirror in the tilted position.

34. The apparatus of claim 33 wherein the pivot arm comprises a moveable electrostatic comb which operates in combination with a pair of stationary electrostatic combs attached to the substrate on either side of the moveable electrostatic comb, with the pivot arm being electrostatically moveable about the pivot to engage the tab and lock the micromirror in the tilted position in response to a first voltage applied between one of the stationary electrostatic combs and the moveable electrostatic comb, and with the pivot arm further being electrostatically moveable about the pivot to disengage from the tab and unlock the mirror for further movement in response to a second voltage applied between the other of the stationary electrostatic combs and the moveable electrostatic comb.

35. The apparatus of claim 34 wherein an electrical connection to the moveable electrostatic comb is made through a hair spring connected between the pivot arm and the substrate.

36. The apparatus of claim 26 further comprising a plurality of stops located beneath each micromirror for contacting each micromirror in the first and second positions to precisely define the position of the micromirror in the first and second positions.

* * * * *